US012718729B2

(12) United States Patent
Li et al.

(10) Patent No.: US 12,718,729 B2
(45) Date of Patent: Aug. 25, 2026

(54) COLOR SEQUENTIAL PIXEL DRIVER FOR IMPLEMENTING HIGH DENSITY microLED DISPLAYS

(71) Applicant: GOOGLE LLC, Mountain View, CA (US)

(72) Inventors: Bo Li, Folsom, CA (US); Kaushik Indravadan Sheth, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/905,386

(22) Filed: Oct. 3, 2024

(65) Prior Publication Data

US 2025/0118237 A1 Apr. 10, 2025

Related U.S. Application Data

(60) Provisional application No. 63/587,878, filed on Oct. 4, 2023.

(51) Int. Cl.
*G09G 3/20* (2006.01)
*G09G 3/32* (2016.01)

(52) U.S. Cl.
CPC ............ *G09G 3/2003* (2013.01); *G09G 3/32* (2013.01); *G09G 2300/0842* (2013.01); *G09G 2310/08* (2013.01); *G09G 2330/028* (2013.01)

(58) Field of Classification Search
CPC .................. G09G 3/2003; G09G 3/32; G09G 2300/0842; G09G 2310/08; G09G 2330/028
See application file for complete search history.

(56) References Cited

U.S. PATENT DOCUMENTS

| | | | | |
|---|---|---|---|---|
| 10,482,814 | B2 * | 11/2019 | Ebisuno | G09G 3/3233 |
| 2011/0134021 | A1 * | 6/2011 | Schmitz | H05B 45/46 345/83 |
| 2019/0114987 | A1 * | 4/2019 | Li | G09G 3/3233 |
| 2020/0410923 | A1 * | 12/2020 | Hudson | G09G 3/3241 |
| 2021/0090493 | A1 * | 3/2021 | Hudson | G09G 3/3241 |
| 2021/0150979 | A1 * | 5/2021 | Huard | G09G 3/2088 |
| 2021/0166618 | A1 * | 6/2021 | Baumheinrich | G09G 3/2081 |
| 2021/0167577 | A1 * | 6/2021 | Zhang | H04B 10/504 |
| 2021/0256901 | A1 * | 8/2021 | Hudson | G09G 3/3426 |
| 2022/0148497 | A1 * | 5/2022 | Li | G09G 3/32 |
| 2023/0327064 | A1 * | 10/2023 | Wu | H10H 20/857 |
| 2023/0335047 | A1 * | 10/2023 | Hudson | G09G 3/3426 |

* cited by examiner

*Primary Examiner* — Ke Xiao
*Assistant Examiner* — Jennifer L Zubajlo
(74) *Attorney, Agent, or Firm* — BRAKE HUGHES BELLERMANN LLP

(57) ABSTRACT

In a general aspect, a display panel includes a plurality of pixel groups. A pixel group of the plurality of pixel groups includes a plurality of light emitters of different colors, and a single current source that is multiplexed to sequentially activate light emitters of the plurality of light emitters using a first plurality of selector switches, The display panel further includes a single driver switch for coupling the single current source with the first plurality of selector switches, and a memory for controlling the single driver switch.

18 Claims, 5 Drawing Sheets

COLOR SEQUENTIAL PIXEL DRIVER FOR IMPLEMENTING HIGH DENSITY microLED DISPLAYS

CROSS-REFERENCE TO RELATED APPLICATION

This application claims the benefit, under 35 U.S.C. § 119, of U.S. Provisional Application No. 63/587,878, filed on Oct. 4, 2023, which is hereby incorporated by reference in its entirety.

BACKGROUND

This disclosure is directed to light emitting devices, such as light emitting diodes (LEDs), microLEDs (μLEDs), as well as associated circuitry for electrically driving such LEDs and/or μLEDs to emit light, e.g., red light, green light, or blue light, such as in a display device. With advances in semiconductor processing, dimensions of μLEDs and related components have decreased. However, increasing a density of pixels in a display (pixels per area), e.g., to improve image resolution and image quality, is limited by the dimensions (in a semiconductor substrate) of the display's pixel groups, not sizes of the corresponding LEDs and/or μLEDs.

SUMMARY

In a general aspect, a display panel includes a plurality of pixel groups. A pixel group of the plurality of pixel groups includes a plurality of light emitters of different colors, and a single current source that is multiplexed to sequentially activate light emitters of the plurality of light emitters using a first plurality of selector switches, The display panel further includes a single driver switch for coupling the single current source with the first plurality of selector switches, and a single memory for controlling the single driver switch.

In a general aspect, a pixel circuit includes a red light emitter, a green light emitter, and a blue light emitter. The pixel circuit also includes a single current source coupled with a power supply, and a single driver switch coupled with the single current source. The pixel circuit also includes a first selector switch coupled between the red light emitter and the single driver switch, a second selector switch coupled between the green light emitter and the single driver switch, and a third selector switch coupled between the blue light emitter and the single driver switch. The pixel circuit further includes a selection circuit configured to sequentially multiplex the red light emitter, the green light emitter and the blue light emitter with the single driver switch.

In a general aspect, a method for operating a pixel circuit includes receiving, at the pixel circuit, pixel data for a plurality of colors. The method also includes coupling a first voltage bias generator with a current source, and coupling a first light emitter of a first color with a driver switch. The driver switch is coupled with the current source. The method further includes operating, based on the pixel data, the first light emitter. The method also includes uncoupling the first light emitter from the driver switch, and uncoupling the first voltage bias generator from the current source. The method still further includes coupling a second voltage bias generator with the current source, coupling a second light emitter of a second color with the driver switch, and operating, based on the pixel data, the second light emitter. The method also includes uncoupling with second light emitter from the driver switch, and uncoupling the second voltage bias generator from the current source.

Figure 1:
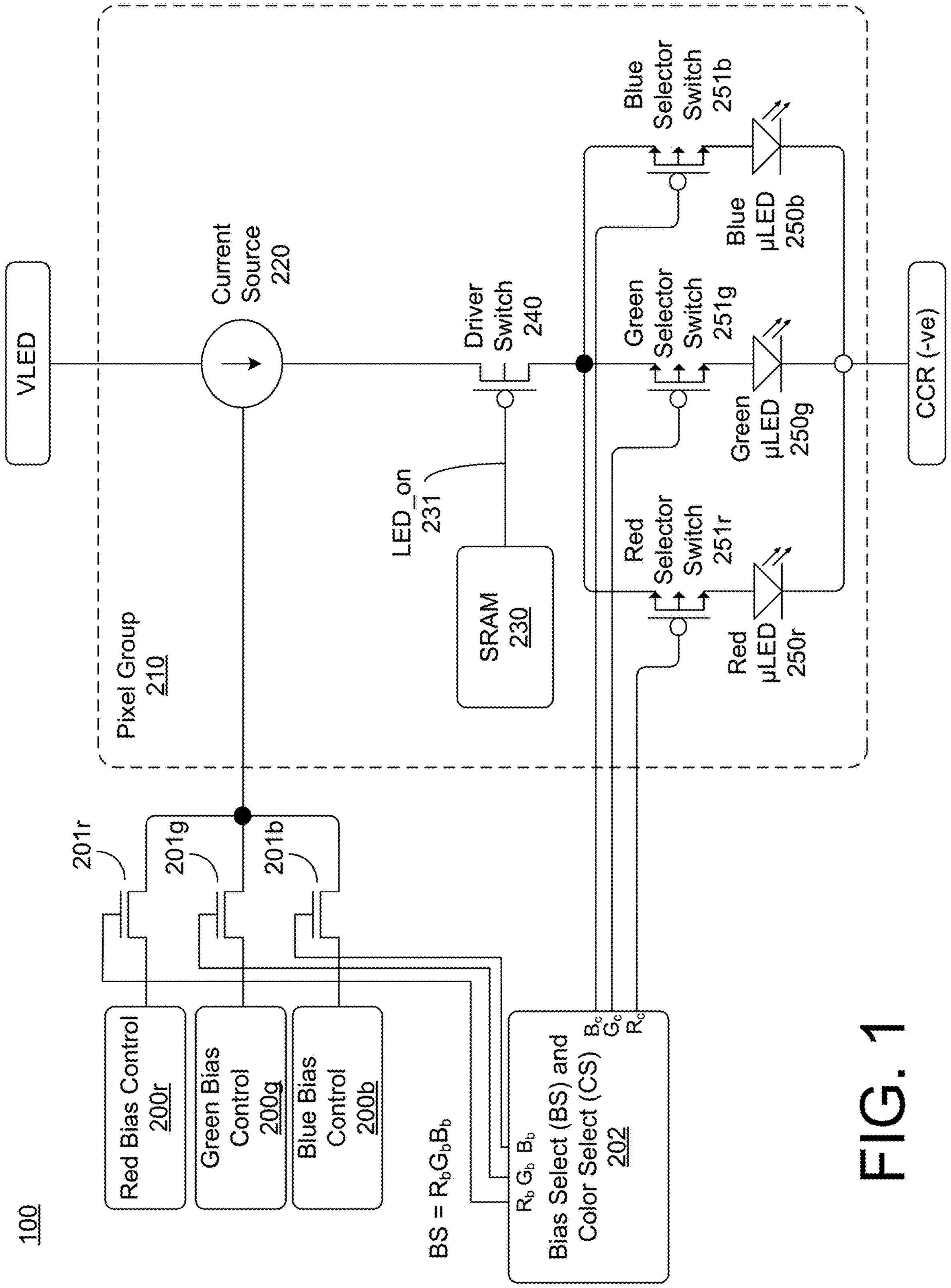
FIG. 1 is a schematic block diagram illustrating an example pixel circuit including a color sequential pixel driver.

In the drawings, which are not necessarily drawn to scale, like reference labels may indicate like and/or similar components (elements, structures, etc.) in different views. The drawings illustrate generally, by way of example, but not by way of limitation, various implementations discussed in the present disclosure. Reference labels shown in one drawing may not be repeated for the same, and/or similar elements in related views. Reference labels that are repeated in multiple drawings may not be specifically discussed with respect to each of those drawings, but are provided for context between related views. Also, not all like elements in the drawings may be specifically referenced with a reference label when multiple instances of that element are illustrated.

DETAILED DESCRIPTION

This disclosure is directed to light emitting devices, such as light emitting diodes (LEDs), microLEDs (μLEDs), and displays (display panels) including such light emitting devices. This disclosure is further directed to circuitry for electrically driving such LEDs and/or μLEDs to emit light, e.g., red light, green light, and/or blue light, such as in a pixel group (pixel circuit, pixel, display pixel, etc.) of a display panel. In this disclosure light emitting devices are collectively referred to as μLEDs for purposes of discussion and illustration.

One technical problem with previous display panels is that pixel density, e.g., a number of display pixels per area, is limited by area of circuity used to drive the μLEDs, and not by sizes of the μLEDs. Accordingly, improving resolution and/or image quality of a display by increasing pixel density is extremely difficult or not possible.

A technical solution to the foregoing technical problem is implementing a display with a pixel circuit that includes a color sequential pixel driver, such as described herein. A technical benefit of this technical solutions is that it can provide for reductions in pixel circuit area and, in turn, increased pixel density in a μLED display panel. For instance, the approaches described herein can facilitate implementing a sub-micron display pixel, which can be one-half or less than the size of current pixel circuits. That is, pixel circuits including color sequential pixel drivers, such as those described herein, can have lateral dimensions, and/or an area on a semiconductor substrate, which are at least two times smaller than lateral dimensions and/or an area of prior pixel circuits and/or pixel drivers.

In some implementations, the approaches described herein can be used to implement a multi-color, binary-modulated, micro-emitter (μLED) display, such as a μLED display panel, including a plurality of μLEDs arranged in pixel groups. For instance, a pixel group can include μLEDs of different colors, e.g., a red μLED, a green μLED, and a blue μLED, which can be used to provide light in a range of colors in the visible spectrum and/or to produce grayscale images.

In previous implementations, μLEDs of a given pixel group are independently controlled by respective driver switches. For instance, prior implementations can have a pixel group that includes a red μLED that is controlled by (driven with, etc.) a first driver switch, a green μLED that is controlled by (driven with, etc.) a second driver switch, and a blue μLED that is controlled by (driven with, etc.) a third driver switch. The driver switches, in turn, are driven, respectively, by signals (e.g., LED_on signals) provided from respective SRAMs (one for each of the red μLED, the green μLED, and the blue μLED). Furthermore, in prior implementations, separate current sources are included for each μLED, where those current sources are respectively controlled using voltages provided by respective bias controls. These bias controls provide respective bias voltages to control respective current amplitudes for each μLED color. Those currents are then are provided to the μLEDs through their respective driver switches. In some implementations, the bias controls can be external to the pixel groups or pixel circuits.

In a display panel, such a pixel group is replicated many times (often hundreds of thousands of times) across the display panel. To improve performance of a display panel, it is advantageous to locate elements within a pixel group as close to their associated emitters (μLEDs) as possible. As geometries shrink, spacing between emitters decreases and, as a result, area (e.g., semiconductor circuit area) available for the driver elements decreases. Said another way, sizes of the driver elements can, at least in part, determine a pitch (spacing) between emitters (μLEDs). Accordingly, sizes of driver elements of a pixel circuit can limit pixel density (e.g., number of pixels per unit area) for a display panel. The approaches described herein, as compared to prior implementations, facilitate reducing area of pixel driver elements, which can allow for increases in pixel density for an associated display panel.

FIG. 1 illustrates a pixel circuit 100 that includes a color sequential pixel driver. As compared to prior implementations in which μLEDs (LEDs, emitters, etc.) of a given pixel group are contemporaneously driven, in the circuit of FIG. 1, the μLEDs are separately driven, in a timed (color) sequence. For instance, in the example of FIG. 1, a pixel group 210 includes a red μLED 250*r*, a green μLED 250*g*, and a blue μLED 250*b*. The red μLED 250*r* can be activated for (driven for, etc.) a first time interval ($t_r$), the green μLED 250*g* can be activated for a second time interval ($t_g$) that is subsequent to, and non-overlapping with the first time interval, and the blue μLED 250*b* can be activated for a third time interval ($t_b$) that is subsequent to, and non-overlapping with the second time interval. That color sequence can then be repeated (e.g., continuously) while a row of a display including the pixel circuit 100 is actively displaying data of a corresponding image. In some implementations, the respective time intervals of $t_r$, $t_g$ and $t_b$ may vary (e.g., within a sequence for the different μLED colors, and/or from sequence to sequence for each μLED color) depending, for example, on visual content (an image or sequence of images) that is being displayed by an associated display panel, such as in the example display of FIG. 4. In some implementations, an activation sequence (color sequence) for emitters of a pixel group can vary, (e.g., red-green-blue, blue-green-red, red-blue-green, etc.).

As shown in FIG. 1, the pixel group 210 includes only a single current source 220 (rather than a current source per μLED), a single SRAM 230 (rather than an SRAM per μLED), and a single driver switch 240 (rather than a driver switch per μLED). As shown in FIG. 1, the single driver switch 240 is controlled by an LED_on signal 231 provided by the single SRAM 230, which is used to store pixel display information (e.g., ON/OFF) for each of the μLEDs of the pixel group 210.

In the example of FIG. 1, a bias select signal (BS) and a color select (CS) signal generated by the bias select (BS) and color select (CS) circuit 202 is used to control multiplexing of respective current source bias voltages provided for each μLED color, e.g., a red bias control 200*r*, a green bias control 200*g*, and a blue bias control 200*b* (e.g., bias control circuits) through respective selector switches 201*r*, 201*g* and 201*b*. For instance, a three bit BS signal generated by the circuit 202 with a red control bit $R_b$, a green control bit $G_b$, and a blue control bit $B_b$ (e.g., $BS=R_bG_bB_b$) can control the selector switches 201*r*, 201*g*, and 201*b*. That is, the BS signal can multiplex the respective bias controls (e.g., red bias control 200*r*, green bias control 200*g*, and blue bias control 200*b*) with the single current source 220, e.g., based on which μLED is being driven in a color sequence. In some implementations, a single multi-bit signal can be generated and inverters used to generate a complementary multi-bit signal. In some implementations, selector switches of a same type can be used for the multiplexing bias control and for multiplexing μLEDS with the single driver switch 240, and a single multi-bit signal can be used for bias selection and μLED selection, with appropriate delays for setup and or hold times, depending on the particular implementation.

In example implementations, the bias controls 200*r*, 200*g* and 200*b*, when selected for activation of a corresponding μLED, control a drive current (provided by the single current source 220) to accommodate for variations in brightness of the μLEDs. The variations can be caused by process variations, and in this case, the bias controls can adjust brightness between different pixels of a display to minimize differences in brightness. The variations can be also caused by a temperature change, which can alter the drive current necessary for the μLEDs to generate light of a particular brightness.

Further in this example, a three bit CS signal generated by the circuit 202 with a red control bit $R_c$, a green control bit $G_c$, and a blue control bit $B_c$ ($BS=R_cG_cB_c$) can control the selector switches 251*r*, 251*g*, and 251*b*. That is, the CS signal can multiplex the respective μLEDs 250*r*, 250*g*, and 250*b* with the single driver switch 240 and the single current source 220, e.g., through the single driver switch 240, based on which μLED is being driven in a color sequence. In example implementations, the selector switches 251*r*, 251*g* and 251*b* can be much smaller devices than the single driver switch 240 and the single current source 220, which allows for size reduction of the pixel circuit 100, as compared with prior implementations including a driver switch and current source per μLED for each pixel group.

As shown in FIG. 1, in this example, the driver switch 240, as well as the selector switch 251*r*, the selector switch 251*g* and the selector switch 251*b* can each be a P-type metal oxide semiconductor (PMOS) transistor. Also in this example, the selector switches 201*r*, 201*g*, the selector switch 201*b* (e.g., the bias control selector switches) can each be an N-type MOS pass-gate transistor. In this arrangement, when driving the μLEDs 250*r*, 250*g* and 250*r* in a color sequence, the BS signal (bias select) and the CS signal (color select) will be complementary. For instance, when driving the LED 250*r* as part of a color sequence, a BS signal of logic "100" will be provided, which will coupled the red bias control 200*r* with the single current source 220 by turning on the selector switch 201*r*. Further in this example, the CS signal will be logic 011, which will coupled the LED 250*r* with the single driver switch 240 through the selector switch 251*r*. The single driver switch 240 can be configured in an ON or OFF condition by the LED_on signal 231 (based on the color of the LED selected by the CS signal and corresponding pixel data for that color stored in the SRAM 230).

Using the circuit of FIG. 1 to implement color sequential operation of a pixel group (e.g., including the μLED 250*r*, μLED 250*g* and the μLED 250*b*) allows for a reduction of a number pixel driver elements (e.g., per pixel), as described herein, which can facilitate achieving a significant reduction in pixel group driver size, as compared to prior implementations. Such pixel group driver size reduction allows for increasing density of pixel groups (e.g., a number of pixel groups per display panel area), which can improve image quality of visual content (e.g., resolution, brightness, contrast, etc.) that is displayed by a corresponding display panel.

Figure 2:
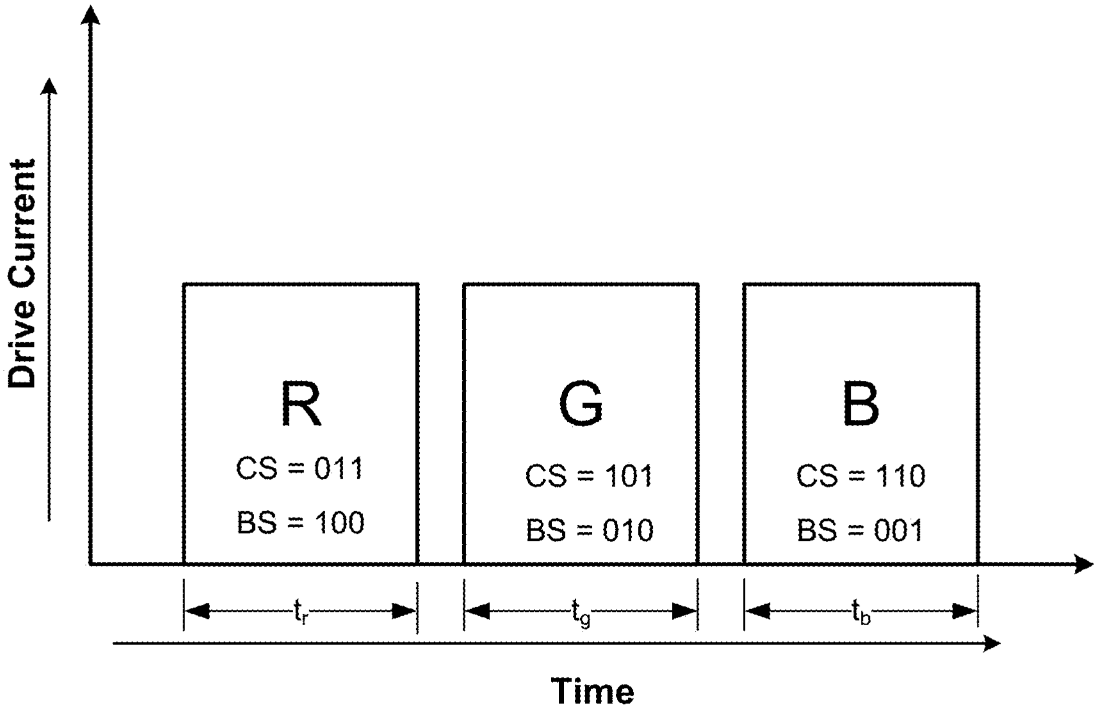
FIG. 2 is a timing diagram schematically illustrating example operation of the pixel circuit of FIG. 1.

FIG. 2 is a timing diagram that schematically illustrates operation of μLEDs in a color sequential pixel circuit (such as the μLED 250*r*, the μLED 250*g* and the μLED 250*b* of the pixel group 210 in FIG. 1). In the timing diagram of FIG. 2, Drive Current (normalized Drive Current) is represented on the y-axis and time (normalized time) is represented on the x-axis. As shown in FIG. 2, in this example, a red LED (e.g., the μLED 250*r*) for a time period $t_r$. Subsequent to the time period $t_r$, a green LED (e.g., the μLED 250*g*) can be driven for a time period $t_g$, which is non-overlapping with the time period $t_r$. In example implementations the time periods $t_r$, $t_g$ and $t_b$, as well as respective drive current provided during those periods can vary.

In some implementations, such as in the example of FIG. 2, there can be a delay between the μLED activation periods (e.g., between the time period $t_r$ and the time period $t_g$). This delay can correspond with switching of the CS signal by the circuit 202, for example. As further shown in FIG. 2, subsequent to the time period $t_g$, a blue LED (e.g., the μLED 250*b*) can be driven for a time period $t_b$, which is non-overlapping with the time period $t_g$, and can occur after a delay period, e.g., to allow for switching of the CS signal.

In some implementations, the circuit 202 can also be configured to establish appropriate setup and hold times for the BS signal and the CS signal, e.g., relative to one another. Such setup and hold times can be prevent, for example, overcurrent in the single current source 220, multiple μLEDs being driven concurrently, etc. The μLED activation time periods (and corresponding delays between activation time periods) will depend on the specific implementation. Also, the activation sequence shown in FIG. 2 is given by way of example and for purposes of illustration. In some implementations, other activation sequences can be used, activation times can vary, drive currents can vary, and so forth.

Examples of the BS signal and the CS signal are respectively indicated for each of the time periods $t_r$, $t_g$ and $t_b$ in FIG. 2. For instance, during the period $t_r$, the BS signal is logic value "100", while the CS signal is 011. This will place the selector switch 201*r* and the selector switch 251*r* in a conducting state. Said another way, the red bias control 200*r* will be coupled with the single current source 220 and the μLED 250*r* will be coupled with the single driver switch 240. Further in the example of FIG. 2, during the period $t_g$, the BS signal is logic "010", while the CS signal is logic "101." This will place the selector switch 201*g* and the selector switch 251*g* in a conducting state. Said another way, the green bias control 200*g* will be coupled with the single current source 220 and the μLED 250*g* will be coupled with the single driver switch 240. Still further in the example of FIG. 2, during the period $t_b$, the BS signal is logic 001, while the CS signal is logic "110." This will place the selector switch 201*b* and the selector switch 251*b* in a conducting state. Said another way, the blue bias control 200*b* will be coupled with the single current source 220 and the μLED 250*b* will be coupled with the single driver switch 240.

Figure 3:
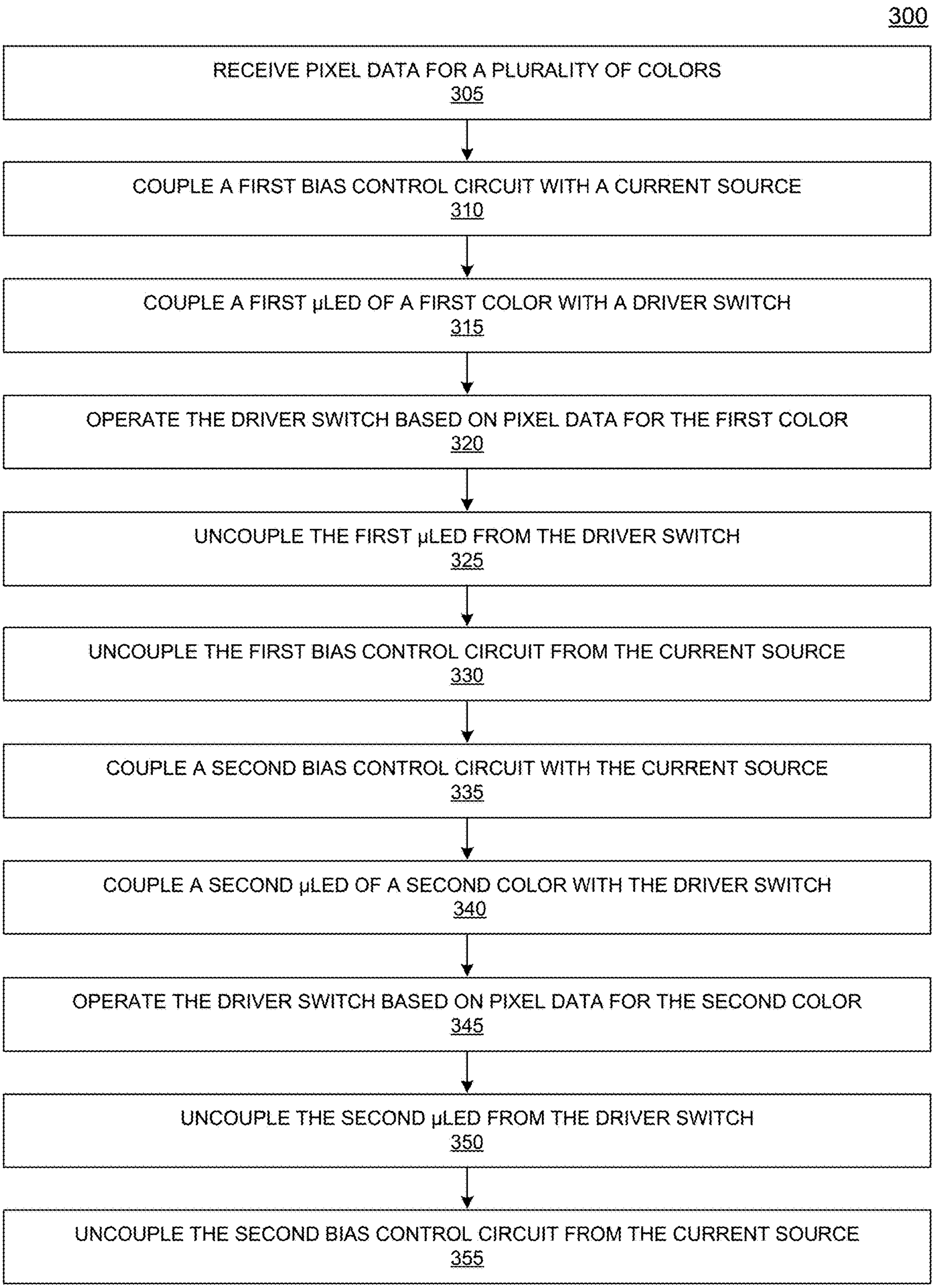
FIG. 3 is a flowchart illustrating an example method of operation for the pixel circuit of FIG. 1.

FIG. 3 is a flowchart illustrating a method 300 for color sequential operation of a pixel circuit, such as the pixel circuit 100 of FIG. 1. For purposes of brevity, FIG. 3 illustrates, by way of example, color sequential operation for μLEDs of two colors, e.g., in the pixel circuit 100 of FIG. 1. In example implementations, similar operations as those of the method 300 can be performed for μLEDs of additional colors, e.g., for red, green and blue μLEDs, such as in the pixel circuit 100. For purposes of illustration, the method is described with further reference to the pixel circuit 100 FIG. 1.

At operation 305, the method 300 includes receiving, at the pixel circuit 100, pixel data for a plurality of colors (e.g., red, green and blue). The pixel data can be stored in the single SRAM 230. At operation 310, the method 300 includes coupling a first bias control for a first color, e.g., the red bias control 200*r*, with the single current source 220 via the selector switch 201*r*. At operation 315, the method 300 includes coupling a first μLED of the first color with the single driver switch 240, e.g., coupling the μLED 250*r* with the single driver switch 240 via the selector switch 251*r*. At operation 320, the method 300 includes operating the single driver switch 240 based on the pixel data for the first color (red) stored in the single SRAM 230, e.g., driving the μLED 250*r*. At operation 325, the μLED 250*r* is uncoupled from the single driver switch 240 and, at operation 330, the red bias control 200*r* is uncoupled from the single current source 220.

At operation 335, the method 300 includes coupling a second bias control for a second color, e.g., the green bias control 200*g*, with the single current source 220 via the selector switch 201*g*. At operation 340, the method 300 includes coupling a second μLED of the second color with the single driver switch 240, e.g., coupling the μLED 250*g* with the single driver switch 240 via the selector switch 251*g*. At operation 345, the method 300 includes operating the single driver switch 240 based on the pixel data for the second color (green) stored in the single SRAM 230, e.g., driving the μLED 250*g*. At operation 350, the μLED 250*g* is uncoupled from the single driver switch 240 and, at operation 355, the green bias control 200*g* is uncoupled from the single current source 220. As noted above, operations similar to 310-330 or 335-355 can be included in the method 300 for driving the μLED 250*b* in a color sequence during operation of a pixel circuit, such as the pixel circuit 100.

Figure 4:
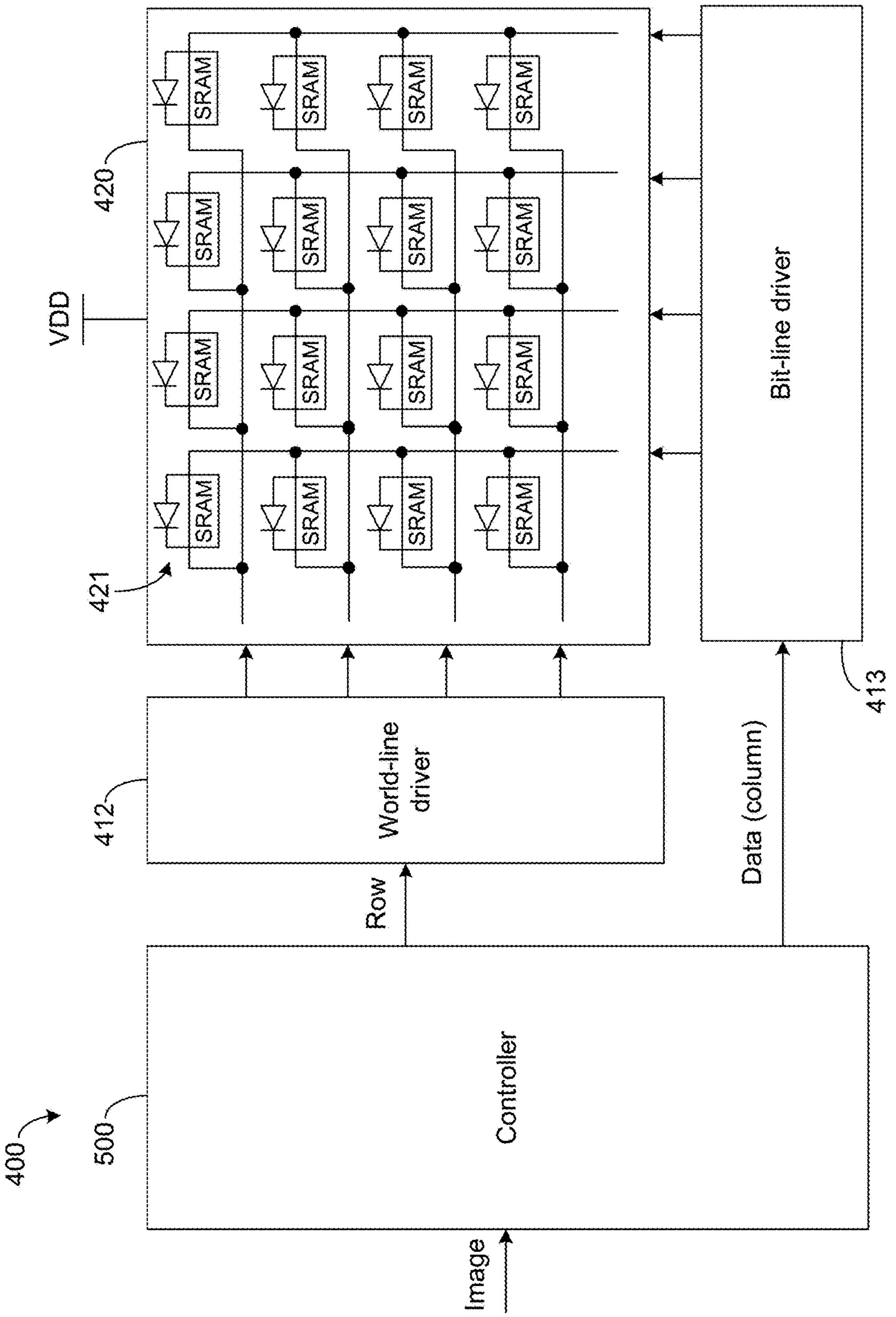
FIG. 4 is a block diagram illustrating an example display system that can be implemented using the pixel circuit of FIG. 1.

FIG. 4 is a schematic block diagram of an example display 400 that can be implemented using pixel drivers with color sequential pixel drivers, such as those described herein. As shown in FIG. 4, the display 400 includes a plurality of pixels arranged in a 2D grid (i.e., pixel array 420). For purposes of illustration and discussion of the display 400, each pixel 421 of the display 400 is illustrated by a single μLED and a corresponding SRAM. In some implementations, as noted above, each pixel 421 of the display 400 can be implemented using the pixel circuit 100 of FIG. 1 (or appropriate elements thereof). That is, each pixel 421 can include a single current source (220) that is sequentially controlled by bias controls (200*r*, 200*g*, and 200*b*) that are multiplexed by a BS signal (as described above), a single driver switch (240) that is controlled by a signal (LED_on signal 231) from an SRAM (230), a red μLED (250*r*), a green μLED (250*g*), a blue μLED (250*b*), selector switches (251*r*, 251*g*, and 251*b*) that are controlled (multiplexed) by a CS signal (as described above).

The SRAM can include a memory cell for setting and maintaining a color sequential illumination state of the μLEDs of a pixel group (e.g., as ON or OFF in correspondence with an image being displayed). The state of an SRAM of a pixel circuit, such as the pixel circuit 100, can be controlled (e.g., set/reset) by a signal (e.g., bit-line signal) transmitted over a column conductor (e.g., a bit-line) coupled to the SRAM. For instance, in the example of FIG. 4, the SRAM of each pixel 421 is coupled to a corresponding bit-line based on a signal (e.g., word-line signal) transmitted over a row conductor (e.g., word-line) to the pixel 421. Accordingly, the display 400 further includes a word-line driver 412 configured to transmit a word-line signal to a word-line (e.g., row) of the pixel array 420. The word-line signal can activate a row so that each pixel 421 in an active row is coupled to its respective bit-line.

As shown in FIG. 4, the display 400 further includes a bit-line driver 413 configured to transmit bit-line signals to the bit-lines of the pixels in an active row. The bit-line signals may change or maintain the state of the SRAMs of pixels 421 in an active row according to a bit plane for an image being displayed. In some implementations, a bit-line signal is a differential signal. In this case, each bit-line may include a positive bit-line (BL+) configured to carry a positive bit-line signal and a negative bit-line configured to carry a negative bit-line signal (BL−). In such differential configurations, the positive bit-line and the negative bit-line may be referred to collectively as the bit-line.

The display 400 further includes a controller 500 configured to control the operation of the word-line driver 412 and the bit-line driver 413 to render a bit plane using the pixel array 420. For example, the controller 500 may transmit a word-line signal (i.e., ROW) to activate a row and then transmit the bit plane data (i.e., DATA(COLUMN)) to the columns of the activated row in parallel.

The controller 500 may be configured to address and write to the SRAMs of the pixel array 420 so that each micro-LEDs is illuminated (e.g., ON) or not illuminated (e.g., OFF) according to a bit plane and based on color-sequential driving of the μLEDS of a pixel 421 (implemented using the pixel circuit 100 of FIG. 1). Each bit plane may be rendered on the pixel array 420 on a row-by-row basis until every row necessary for rendering the bit plane has been activated.

In some implementations, a rendering process includes transmitting a word-line signal to activate a row. After being activated, a bit-line signal for each pixel in the row controls, in accordance with operation of a color sequential pixel driver, LED_on signal 231 for each μLED of a pixel group according to the bit plane data for each pixel in the active row. After the bit-line signals configure (e.g., write to) the pixels of the active row, the row may be deactivated, and another row may be activated until all rows of a bit plane have been activated. The SRAMs for pixels in deactivated rows can hold the pixels of the deactivated rows ON or OFF while the other rows of the bit plane are activated. After writing a bit plane to the SRAM cells of the pixel array 420, the SRAMs can hold their values (e.g., 0, 1) until they are changed, and continue color sequential display of image data (respective pixels) based on the held values. As a result, updating the values (e.g., red, green and blue values) in an SRAM (such as the single SRAM 230) may only require a portion of the SRAM cells to change their state e.g., flip) from bit plane to bit plane. This feature of the display 400 can contribute to low power consumption of the display. A sequence of binary bit planes, in which each μLED of a pixel circuit is either ON (e.g., SRAM at binary 1) or OFF (e.g., SRAM at binary 0) may be rendered at a high rate, with color sequential driving the μLEDs of a pixel circuit happening at an equivalent, or higher rate, so as to display a stable image perceived by an observer, without visual artifacts, such as flicker, etc.

Figure 5:
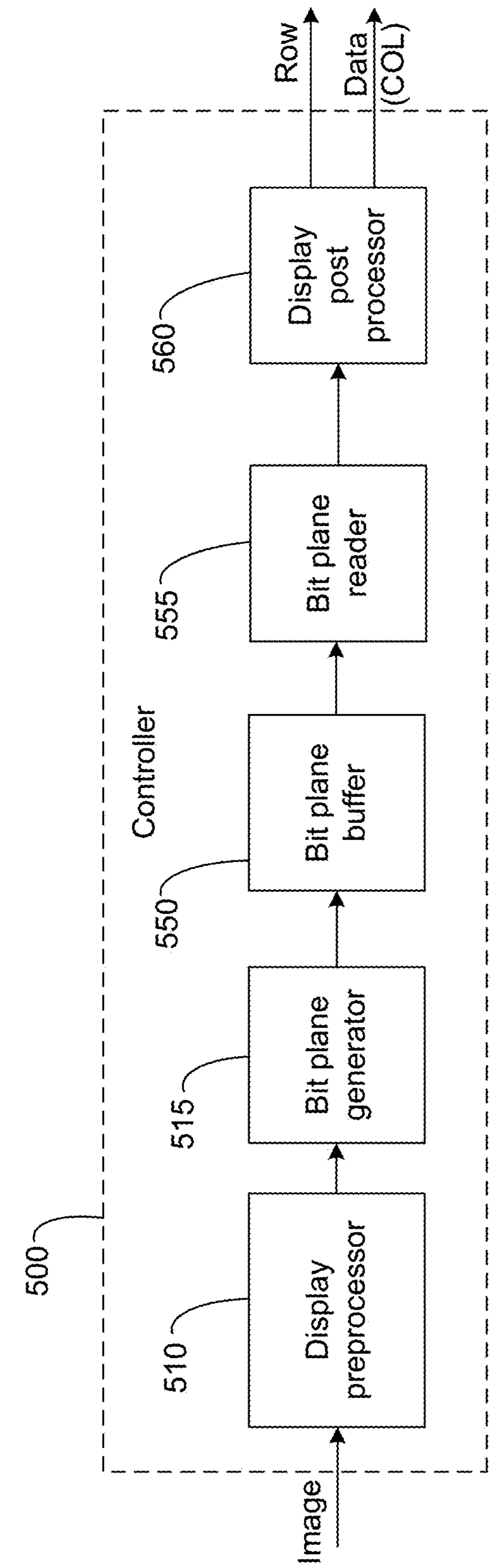
FIG. 5 is a block diagram illustrating an example controller that can be included in the display system of FIG. 4.

FIG. 5 is a block diagram of an example controller 500 for a display, such as the display 400 of FIG. 4 (display system). As noted above, the display 400 can be implemented using pixel circuits such as the pixel circuit 100 of FIG. 1. In some implementations, the controller 500 can be implemented as a unitary device, or can be implemented as part of a distributed computing system. In this example, the controller 500 includes digital processing, logic, and memory to perform operations associated with controlling the pixels (and the μLEDS of each pixel, e.g., sub-pixels) in a pixel array to render (e.g., display) an image. These operations may be performed by modules, which can include circuitry and/or software to perform one or more of the operations. In other words, the controller 500 may be configured by software instructions stored in (and recalled from) a non-transitory computer readable memory to perform the methods to control the pixels of the display.

As shown in FIG. 5, the controller 500 includes a display preprocessor module (i.e., display preprocessor 510). The display preprocessor 510 may be configured to receive an image for display. The image may be a grayscale image or a color image. A color image for display can include three color channels, each represented by a gray scale image. Accordingly, for purposes of illustration, an example of a grayscale image for display is discussed below. In this example, preprocessing performed by the display preprocessor 510 may include formatting and filtering (e.g., thresholding) necessary to adapt an image to the format and structures necessary for rendering in, for example, the display 400.

The controller 500 further includes a bit plane generator 515 configured to generate a set of bit planes based on the received image data. The generation by the bit plane generator 515 may result in a number of bit planes corresponding to a bit depth of a corresponding display. The bit planes can be written to a bit plane buffer 550 (e.g., memory), which can receive and store bit planes as they are generated.

Such bit planes may be stored until all bit planes in a bit plane sequence are complete and ready for rendering. In come implementations, compression (e.g., lossless compression) may be used to reduce a size (e.g., storage capacity) of a bit plane buffer (not shown). Such a bit plane buffer may be partitioned into segments defined by the memory locations associated with the segment. The segments can be configured to store particular bit planes. For example, pairs of bit planes may be written to each segment of the bit plane buffer 550.

As shown in FIG. 5, the controller 500 may further include a bit plane reader 555 configured to recall nonzero bit planes from the bit plane buffer 550. In particular, the bit plane reader 555 may assemble the sequence of bit planes by recalling the bit planes from their respective segments in the bit plane buffer 550. In some implementations, the bit plane reader 555 may be further configured to decompress the recalled bit planes.

The controller 500 further includes a display post processor 560 that can create a weighted sequence of bit planes and the word-line and bit-line signals necessary for rendering the bit planes on a pixel array, such as the pixel array 420 of the display 400. For example, the display post processor 560 can include a sequence timing generator that is configured to control the timing of the bit periods of a rendering period. In other words, the display post processor 560 can generate PWM signals for the pixels of the display. Color sequential driving of μLEDs of respective pixel circuits can be done as a subordinate timing sequence to a render period of a display. That is, a period for such color sequential driving of μLEDs of a pixel circuit can be shorter than a rendering period for a display in which the pixel circuit is included.

In a general aspect, a display panel includes a plurality of pixel groups. A pixel group of the plurality of pixel groups includes a plurality of light emitters of different colors, and a single current source that is multiplexed to sequentially activate light emitters of the plurality of light emitters using a first plurality of selector switches, The display panel further includes a single driver switch for coupling the single current source with the first plurality of selector switches, and a single memory for controlling the single driver switch.

Implementations can include one or more of the following features, alone or in combination. For example, the display panel can include a color selection circuit configured to provide a color select signal for multiplexing the single current source to the plurality of light emitters. The color selection circuit can be configured to provide a bias select signal for multiplexing a plurality of voltage bias generators with the single current source. The color select signal can be a first multi-bit signal, and the bias select signal can be a second multi-bit signal that is complementary to the first multi-bit signal.

The display panel can include a second plurality of selector switches for multiplexing a plurality of voltage bias generators with the single current source. Multiplexing the plurality of voltage bias generators with the single current source can be based on the color select signal. The plurality of voltage bias generators can be multiplexed with the single current source based on multi-bit signal that is a complement of the color select signal.

The plurality of voltage bias generators can include a first voltage bias generator corresponding with a red light emitter of the pixel group, a second voltage bias generator corresponding with a green light emitter of the pixel group, and a third voltage bias generator corresponding with a blue light emitter of the pixel group.

The color select signal can be a multi-bit signal.

In another general aspect, a pixel circuit includes a red light emitter, a green light emitter, and a blue light emitter. The pixel circuit also includes a single current source coupled with a power supply, and a single driver switch coupled with the single current source. The pixel circuit also includes a first selector switch coupled between the red light emitter and the single driver switch, a second selector switch coupled between the green light emitter and the single driver switch, and a third selector switch coupled between the blue light emitter and the single driver switch. The pixel circuit further includes a selection circuit configured to sequentially multiplex the red light emitter, the green light emitter and the blue light emitter with the single driver switch.

Implementations can include one or more of the following features, alone or in combination. For example, the pixel circuit can include a memory configured to store pixel data for controlling the single driver switch.

The pixel circuit can include a fourth selector switch coupled between the single current source and a first voltage bias generator, a fifth selector switch coupled between the single current source and a second voltage bias generator, and a sixth selector switch coupled between the single current source and a third voltage bias generator. The selection circuit can be configured to sequentially multiplex the first voltage bias generator, the second voltage bias generator, and the third voltage bias generator with the single current source.

The selection circuit can generate a first multi-bit signal for multiplexing the red light emitter, the green light emitter and the blue light emitter with the single driver switch, and generate a second multi-bit signal for multiplexing the first voltage bias generator, the second voltage bias generator, and the third voltage bias generator with the single current source. The second multi-bit signal can be a complement of the first multi-bit signal.

In another general aspect, a method for operating a pixel circuit includes receiving, at the pixel circuit, pixel data for a plurality of colors. The method also includes coupling a first voltage bias generator with a current source, and coupling a first light emitter of a first color with a driver switch. The driver switch is coupled with the current source. The method further includes operating, based on the pixel data, the first light emitter. The method also includes uncoupling the first light emitter from the driver switch, and uncoupling the first voltage bias generator from the current source. The method still further includes coupling a second voltage bias generator with the current source, coupling a second light emitter of a second color with the driver switch, and operating, based on the pixel data, the second light emitter. The method also includes uncoupling with second light emitter from the driver switch, and uncoupling the second voltage bias generator from the current source Implementations can include one or more of the following features, alone or in combination. For example, the method can include coupling a third voltage bias generator with the current source, coupling a third light emitter of a third color with the driver switch, operating the third light emitter based on the pixel data, uncoupling with third light emitter from the driver switch, and uncoupling the third voltage bias generator from the current source.

The first color is red; the second color is green; and the third color is blue.

Receiving the pixel data can include storing the pixel data in a memory of the pixel circuit. Operating the first light emitter and the second light emitter can be based on pixel data stored in the memory.

The method can include generating a first multi-bit signal that controls coupling the first voltage bias generator, the second voltage bias generator, and the third voltage bias generator with the current source. The method can include generating a second multi-bit signal that controls coupling the first light emitter, the second light emitter, and the third light emitter with the driver switch.

Example implementations can include a non-transitory computer-readable storage medium comprising instructions stored thereon that, when executed by at least one processor, are configured to cause a computing system to perform any of the methods described above. Example implementations can include an apparatus including means for performing any of the methods described above. Example implementations can include an apparatus including at least one processor and at least one memory including computer program code, the at least one memory and the computer program code configured to, with the at least one processor, cause the apparatus at least to perform any of the methods described above.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or subcombinations of the functions, components and/or features of the different implementations described.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

The terminology used herein is for the purpose of describing particular implementations only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

The invention claimed is:

1. A display panel comprising:

a plurality of pixel groups, a pixel group of the plurality of pixel groups including:

a plurality of light emitters of different colors;

a single current source that is multiplexed to activate light emitters of the plurality of light emitters sequentially using a first plurality of selector switches;

a plurality of voltage bias generators multiplexed with the single current source based on a first input;

a single driver switch for coupling the single current source with the first plurality of selector switches based on a second input from a circuit configured to select a color, the second input is complementary to the first input; and a single memory for controlling the single driver switch.

2. The display panel of claim 1, further comprising a color selection circuit configured to provide a color select signal for multiplexing the single current source to the plurality of light emitters via the single driver switch and the first plurality of selector switches.

3. The display panel of claim 2, wherein the color selection circuit is further configured to provide a bias select signal for multiplexing the plurality of voltage bias generators with the single current source.

4. The display panel of claim 3, wherein:

the color select signal is a first multi-bit signal; and the bias select signal is a second multi-bit signal that is complementary to the first multi-bit signal.

5. The display panel of claim 2, further comprising:

a second plurality of selector switches for multiplexing the plurality of voltage bias generators with the single current source.

6. The display panel of claim 5, wherein multiplexing the plurality of voltage bias generators with the single current source is based on the color select signal.

7. The display panel of claim 5, wherein the plurality of voltage bias generators are multiplexed with the single current source based on a multi-bit signal that is a complement of the color select signal.

8. The display panel of claim 5, wherein the plurality of voltage bias generators includes:

a first voltage bias generator corresponding with a red light emitter of the pixel group;

a second voltage bias generator corresponding with a green light emitter of the pixel group; and a third voltage bias generator corresponding with a blue light emitter of the pixel group.

9. The display panel of claim 2, wherein the color select signal is a multi-bit signal.

10. A pixel circuit comprising:

a red light emitter;

a green light emitter;

a blue light emitter;

a single current source coupled with a power supply;

a single driver switch coupled with the single current source;

a plurality of selector switches including:

a first selector switch coupled between the red light emitter and the single driver switch;

a second selector switch coupled between the green light emitter and the single driver switch; and a third selector switch coupled between the blue light emitter and the single driver switch;

a plurality of voltage bias generators multiplexed with the single current source based on a first input; and a selection circuit configured to sequentially multiplex the red light emitter, the green light emitter and the blue light emitter with the single driver switch via the plurality of selector switches based on a second input associated with selection of a color, the second input is complementary to the first input.

11. The pixel circuit of claim 10, further comprising:

a memory configured to store pixel data for controlling the single driver switch.

12. The pixel circuit of claim 10, further comprising:

a fourth selector switch coupled between the single current source and a first voltage bias generator;

a fifth selector switch coupled between the single current source and a second voltage bias generator;

a sixth selector switch coupled between the single current source and a third voltage bias generator, and the selection circuit being further configured to sequentially multiplex the first voltage bias generator, the second voltage bias generator, and the third voltage bias generator with the single current source.

13. The pixel circuit of claim 12, wherein the selection circuit:

generates a first multi-bit signal for multiplexing the red light emitter, the green light emitter and the blue light emitter with the single driver switch via the plurality of selector switches based on the second input; and generates a second multi-bit signal for multiplexing the first voltage bias generator, the second voltage bias generator, and the third voltage bias generator with the single current source, the second multi-bit signal being a complement of the first multi-bit signal.

14. A method for operating a pixel circuit, the method comprising:

receiving, at the pixel circuit, pixel data for a plurality of colors;

coupling a first voltage bias generator of a plurality of voltage bias generators with a current source;

coupling a first light emitter of a first color with a driver switch via a first selector switch of a plurality of selector switches based on a first input from a circuit configured to select the first color, the driver switch being coupled with the current source and the plurality of selector switches;

operating, based on the pixel data, the first light emitter via the first selector switch;

uncoupling the first light emitter from the driver switch;

uncoupling the first voltage bias generator from the current source;

coupling a second voltage bias generator of the plurality of voltage bias generators with the current source;

coupling a second light emitter of a second color with the driver switch via a second selector switch of the plurality of selector switches based on a second input from the circuit configured to select the second color, the second input is complementary to the first input;

operating, based on the pixel data, the second light emitter via the second selector switch;

uncoupling the second light emitter from the driver switch; and uncoupling the second voltage bias generator from the current source.

15. The method of claim 14, further comprising:

coupling a third voltage bias generator with the current source;

coupling a third light emitter of a third color with the driver switch via a third selector switch of the plurality of selector switches based on a third input from the circuit configured to select the third color;

operating, based on the pixel data, the third light emitter via the third selector switch;

uncoupling the third light emitter from the driver switch; and uncoupling the third voltage bias generator from the current source.

16. The method of claim 15, wherein:

the first color is red;

the second color is green; and the third color is blue.

17. The method of claim 15, further comprising:

generating a first multi-bit signal that controls coupling the first voltage bias generator, the second voltage bias generator, and the third voltage bias generator with the current source; and generating a second multi-bit signal that controls coupling the first light emitter, the second light emitter, and the third light emitter with the driver switch.

18. The method of claim 14, wherein:

receiving the pixel data includes storing the pixel data in a memory of the pixel circuit; and operating the first light emitter and the second light emitter is based on pixel data stored in the memory.

* * * * *